United States Patent Office

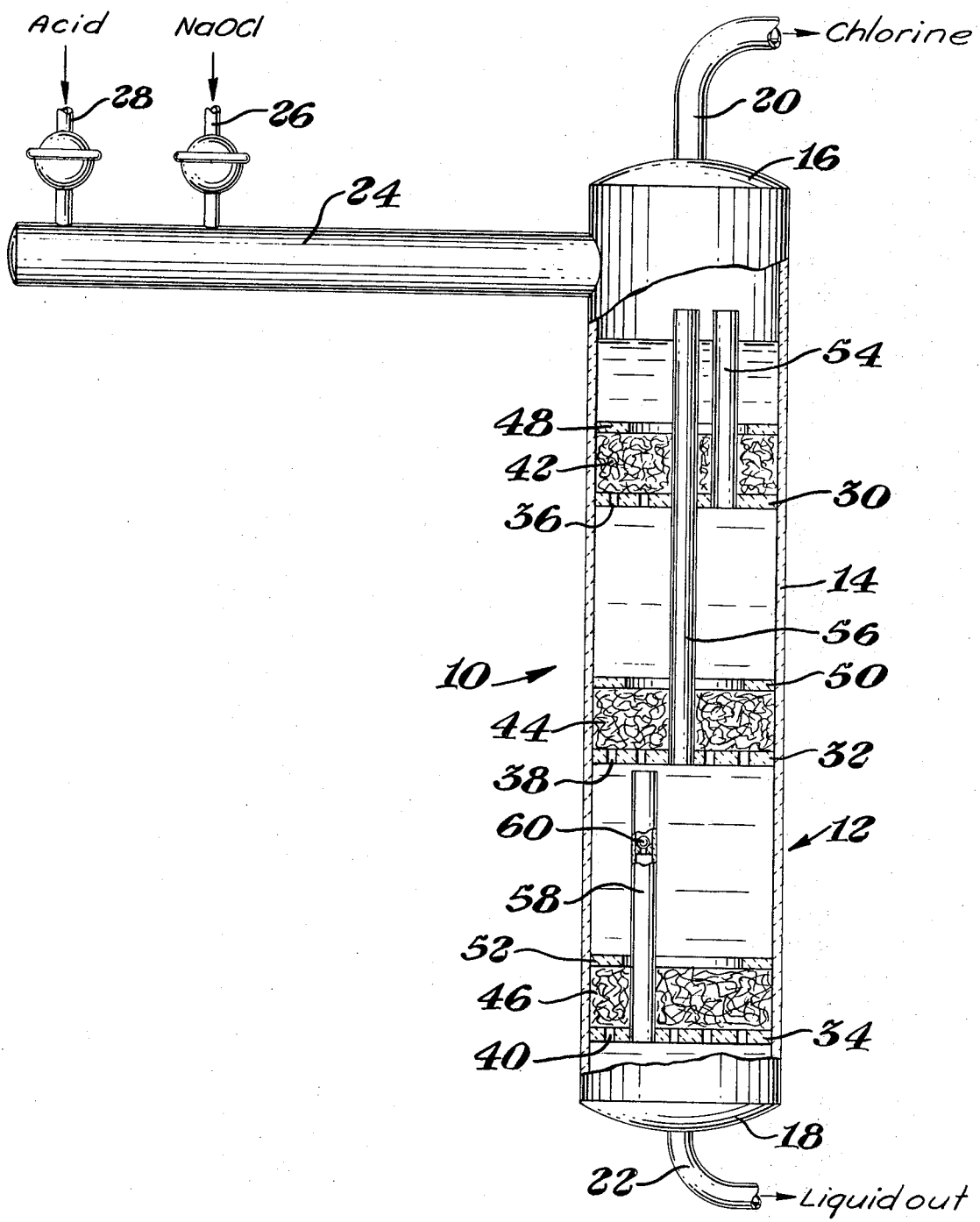

3,516,799
Patented June 23, 1970

3,516,799
LIQUID DEGASSING APPARATUS
Ronald L. Dotson, Baton Rouge, La., assignor to The Dow Chemical Company, Midland, Mich., a corporation of Delaware
Filed Feb. 2, 1967, Ser. No. 613,465
Int. Cl. B01d 19/00
U.S. Cl. 23—283
3 Claims

ABSTRACT OF THE DISCLOSURE

The invention concerns an apparatus for degassing liquids wherein the liquid to be degassed is passed through one or more porous filters (woven glass fiber mass, for example) to separate the gas by means of the disruptive effect of a porous surface on the equilibrium of a gas dissolved in a liquid. Since separation may take place at both the entry and exit surface of the filter, means are provided for bypassing gas separated at the exit surface through or around the filter.

---

This invention relates to a method and apparatus for degassing liquids, and particularly to a method and filter apparatus for use in degassing liquids.

BACKGROUND OF THE INVENTION

Dissolved gases usually are removed from liquids by either chemical combination and precipitation or inducing the gaseous component to assume the vapor phase. The latter method requires a disturbing of the equilibrium between the gas and the liquid, which is accomplished in the art by (a) heating the liquid and lowering the solubility of the gas, (b) passing an insoluble gas through the liquid, thus sweeping out the gas, or (c) placing the liquid under some degree of vacuum.

A principal object of this invention is to provide an improved apparatus for use in degassing liquids.

Yet another object of this invention is to provide an improved, simple to construct and operate apparatus for degassing liquids.

In accordance with this invention there is provided liquid degassing apparatus comprising an enclosed chamber having one or more filter-partitions dividing the enclosure into compartments. The liquid to be degassed and an acid (if any is used) enter the enclosure near one end of the enclosure. Degassed liquid is withdrawn from the other end compartment of the enclosure while gas is withdrawn from the end compartment into which the liquid to be degassed is introduced. The filter sections across each partition are porous, and may be made of woven glass fibers, for example. Means are provided through the filter-partition to pass gas released below.

The liquid to be degassed is passed through a porous filter element under suitable pressure and flow conditions, causing gas to separate at the upper part of the filter and, in many cases, at the lower part of the filter.

The process of the present invention depends upon the disruptive effect of a porous surface on the equilibrium of a gas dissolved in a liquid, resulting in an unstable suspension of gas in liquid, which rapidly accomplishes a separation into discrete homogeneous phases.

The invention, as well as additional objects and advantages thereof, will best be understood when the following detailed description is read in connection with the accompanying single drawing.

Referring to the drawing, there is shown degassing apparatus, indicated generally by the numeral 10, which comprises an elongated enclosed hollow tubular vessel 12 having side walls 14 and ends 16, 18 either made of vitreous material or lined on the interior of said vessel with a vitreous material.

A gas flow line 20 extends through and is sealed to the top end 16 of said vessel.

A liquid flow line extends through and is sealed to the lower end 18 of said vessel.

A fluid inlet tube 24 is coupled to and extends through the side wall 4 of the vessel 12 slightly below the top 16 of the vessel. An inlet line 26 for liquid to be degassed, indicated as an input line for sodium hypochlorite in the drawing, is coupled to the tube 24. An acid inlet line 28 is also coupled to the inlet tube 24.

Partitions 30, 32, 34, made of vitreous or other material not chemically reactive with the material passing through the vessel, are disposed in spaced apart relationship along the length of the vessel 12. Each of the partitions have a plurality of small diameter bores 36, 38, 40, respectively, extending through them.

A filter bed 42, 44, 46 illustrated as being a mass of woven glass fibers, is disposed above and resting on each of the partitions 30, 32, 34, respectively. A retainer washer 48, 50, 52, is disposed on top of each filter bed 42, 44, 46, respectively.

The optimum size of the filter pores must be determined empirically, since it is dependent upon solution viscosity, temperature, and many other physical as well as chemical properties of the gas and the liquid.

One gas-containing liquid which has been successfully degassed in accordance with the method and apparatus of this invention is sodium hypochlorite. When the hypochlorite concentration in the liquid is low and sodium hydroxide concentration high, chlorine is released from solution on the addition of an acid, such as sulfuric acid, for example. However, the gas is liberated rather slowly under such conditions. It has been found that mixing the sodium hypochlorite containing liquid with acid and passing the mixture through the apparatus of the invention results in a greatly increased rate and total amount of chlorine being separated from the liquid than when the method of the invention is not used. Hypochlorite to acid ratios of about 6 to 1 are found to give the best gas recovery in accordance with this invention. The acid solution may be a 50 percent sulfuric acid solution, for example. Hydrochloric acid is also operable.

The addition of acid or other liquids to the gas containing liquid is not necessary in many cases. For instance, beer or other carbonated beverages may be degassed in accordance with this invention by passing the beverage through the filter bed or beds.

Maintaining at least a small liquid level above each filter has been found to be advantageous.

Bleed-off tubes 54, 56, 58 extend upwardly from the bottom of each partition 30, 32, 34, respectively. Each bleed-off tube has a check valve (60 in tube 58) disposed in it to prevent downward flow through the tubes.

In operation, the liquid to be degassed enter the vessel 12 through the inlet tube 24 and flows downwardly through the porous filters 42, 44, 46. As the liquid to be degassed passes through each filter, which is composed of a material which is wetted by the liquid, the gas-liquid equilibrium is disrupted and gas bubbles are formed and released at the upper or upstream surface of the filter. If the filter material is permeable to the gas as well as to the liquid, secondary nucleation will occur and gas will form in a pocket at the lower or downstream surface of the filter. Gas separated at the lower or downstream portion of the filter (5) rises though the filter(s) by means of the bleed-off tubes 54, 56, 58.

The bleed-off tubes 54, 56 are connected in parallel, while for the sake of illustration, the bleed-off tube 58 operates in an "in series" manner. That is, gas passing through the tube 58 must also pass through the tube 56 before it reaches the upper end of the vessel 12 and is withdrawn through the gas outlet tube 20.

Other materials than glass fibers may be used in making the filter(s). Glass beads and crumpled glass cloth have been used, though results have not been as good as when glasswool has been used.

What is claimed is:
1. Apparatus for use in degassing liquids, comprising
   (A) An enclosed vessel having side walls, an upper end and a lower end;
   (B) A gas outlet tube coupled to said upper end and communicating with the interior of said vessel;
   (C) A liquid outlet tube, said outlet tube being coupled to said lower end and communicating with the interior of said vessel;
   (D) A flowable materials inlet line, said line being coupled to said side walls near said upper end and communicating with the interior of said vessel, and
   (E) At least one porous filter disposed across said vessel between where said inlet line communicates with the interior of said vessel and the lower end of said vessel, said filter having tubular gas flow means extending therethorugh and upwardly therefrom, the flow means closest to the lower end of said vessel having a check valve therein.
2. Apparatus in accordance with claim 1, wherein said filter is composed of woven glass fibers which are disposed across the path of liquid flow through said vessel.
3. Apparatus in accordance with claim 1, wherein a plurality of filters are disposed in spaced apart relationship along said vessel.

References Cited
FOREIGN PATENTS
| | | |
|---|---|---|
| 704,092 | 2/1965 | Canada. |
| 968,653 | 5/1950 | France. |
| 1,022,470 | 3/1966 | Great Britain. |

JAMES H. TAYMAN, Jr., Primary Examiner

U.S. Cl. X.R.

23—1, 86; 55—36, 38, 41, 71, 186, 523; 99—48